United States Patent
Bergek et al.

(10) Patent No.: US 9,750,078 B2
(45) Date of Patent: Aug. 29, 2017

(54) WIRELESS COMMUNICATION SYSTEM FOR MOVING VEHICLES

(71) Applicants: Martin Bergek, Askim (SE); Mats Karlsson, Valberg (SE); Claes Beckman, Stockholm (SE)

(72) Inventors: Martin Bergek, Askim (SE); Mats Karlsson, Valberg (SE); Claes Beckman, Stockholm (SE)

(73) Assignee: ICOMERA AB, Gothenburg (SE)

( * ) Notice: Subject to any disclaimer, the term of this patent is extended or adjusted under 35 U.S.C. 154(b) by 2 days.

(21) Appl. No.: 13/895,628

(22) Filed: May 16, 2013

(65) Prior Publication Data
US 2013/0310021 A1 Nov. 21, 2013

(30) Foreign Application Priority Data
May 16, 2012 (EP) .................................... 12168245

(51) Int. Cl.
*H04W 84/00* (2009.01)

(52) U.S. Cl.
CPC ................................. *H04W 84/005* (2013.01)

(58) Field of Classification Search
CPC ..... H04W 28/02; H04W 88/10; H04W 12/08; H04W 24/04; H04W 36/0083; H04W 36/14; H04W 36/30; H04W 48/02; H04L 12/56; H04L 12/66; H04L 2209/80; H04L 41/0803; H04L 63/0876; H04L 63/101; H04L 63/108
See application file for complete search history.

(56) References Cited

U.S. PATENT DOCUMENTS

| | | | |
|---|---|---|---|
| 2003/0050064 A1* | 3/2003 | Davies ................. | H04W 36/12 455/441 |
| 2007/0030857 A1 | 2/2007 | Fulknier et al. | |
| 2008/0049722 A1* | 2/2008 | Yuen .................... | H04M 3/567 370/352 |
| 2008/0139243 A1* | 6/2008 | Lin ....................... | H04B 1/006 455/553.1 |
| 2009/0299788 A1* | 12/2009 | Huber ............... | G06Q 20/1235 455/456.3 |
| 2010/0234071 A1* | 9/2010 | Shabtay .............. | H04B 7/0408 455/562.1 |
| 2010/0289640 A1* | 11/2010 | Annamalai ............ | H04W 4/02 340/539.13 |

(Continued)

*Primary Examiner* — Chuong A Ngo
(74) *Attorney, Agent, or Firm* — Harness, Dickey & Pierce, P.L.C.

(57) ABSTRACT

A wireless communication system for a moving vehicle, such as trains, is disclosed. The system includes at least one router in the moving vehicle for receiving and transmitting wireless voice communication and data communication to and from a stationary communication server outside the moving vehicle through an exterior mobile network. Further, the system includes at least one femtocell provided within the moving vehicle, and being connected to the router for wireless transferring of wireless voice communication and data communication between mobile terminals within the moving vehicle and the router. The at least one femtocell is controlled by a femtocell controller directly or indirectly connected to the communication server outside the moving vehicle.

18 Claims, 2 Drawing Sheets

(56) References Cited

U.S. PATENT DOCUMENTS

| | | | | |
|---|---|---|---|---|
| 2011/0111767 A1* | 5/2011 | Livanos | ................ | H04W 28/16 |
| | | | | 455/452.2 |
| 2011/0116373 A1 | 5/2011 | Lauer | | |
| 2011/0249658 A1* | 10/2011 | Wohlert | .................. | H04W 4/04 |
| | | | | 370/338 |
| 2015/0131618 A1* | 5/2015 | Chen | ..................... | H04W 16/02 |
| | | | | 370/332 |

* cited by examiner

WIRELESS COMMUNICATION SYSTEM FOR MOVING VEHICLES

PRIORITY STATEMENT

The present application hereby claims priority under 35 U.S.C. §119 to European patent application number EP 12168245.4 filed May 16, 2012, the entire contents of which are hereby incorporated herein by reference.

TECHNICAL FIELD OF THE INVENTION

The present invention relates to a wireless communication system for moving vehicles.

BACKGROUND

There is today an increasing demand from passengers to be able to communicate through mobile phones and other handheld terminals when travelling on trains, and also to be able to get access to the Internet with laptops, PDAs etc. However, train carriages are made of metal, and even the windows are normally covered with a metal film. Accordingly, train carriages are shielded compartments, and direct communication between terminal antennas within the carriages and externally located antennas is difficult to obtain. Further, with the new smartphones, and the way these are used, with e.g. continuously operating applications, many phones are active at all times, meaning that many handovers are required when the train moves. Even though this problem is common for all moving vehicles, it is especially pronounced for vehicles moving at high speed, such as trains.

To this end, train carriages are often provided with an external antenna connected to a repeater unit within the carriage, which in turn is connected to an internal antenna. Hence, the communication between the passengers' terminals and the operator antennas outside the trains occurs through the repeater unit. Similarly, it is known to provide a mobile access router for data communication, also connected both to an external antenna and an internal antenna, in each carriage, in order to provide Internet access on-board the train. Such mobile access router solutions are e.g. commercially available from the applicant of the present application, Icomera AB, of Gothenburg, Sweden.

However, today's systems are not entirely satisfactory. Trains often pass through areas with bad radio coverage, and the repeater units, nowadays handling both traditional voice communication and data communication, through e.g. 3G, are often unable to handle the required traffic. As a consequence, telephone conversations will often be disrupted and disconnected inadvertently.

Another drawback with today's systems is that there is a frequent need for upgrading of the systems, since the repeater units need to be able to handle all available frequency bands and be up to date with all new system requirements. This means that several units in each carriage frequently need to be replaced, which is a very costly procedure. It is also difficult to supervise the operation of the different components of the system, which leads to cumbersome and costly error detections etc in cases of malfunction. As a consequence, the operation performance is often deteriorated due to problems not being recognized. Malfunctioning repeaters also often deteriorate other communication equipment on-board a train, such as data communication equipment. Further, even properly functioning repeaters may deteriorate the performance of other communication equipment.

Another drawback with today's systems is that the repeater units and the mobile access router require a significant amount of space and power. Consequently, these units need to be placed in a separate cooled compartment on the train. Since both power and space is a scarce resource on-board a train, this significantly adds to the costs of using the known systems.

Still another drawback with today's systems is that is difficult or even impossible to implement new and more efficient transmission solutions, such as MIMO.

There is therefore a need for an improved train communication system which provides better capacity and/or lowers the overall costs of installing and maintaining the system. Even though the above discussion is focused on trains, similar situations and problems are encountered in many other types of moving passenger vehicles, such as buses, ships and airplanes.

SUMMARY OF THE INVENTION

It is therefore an object of the present invention to provide a wireless communication system for moving vehicles which alleviates all or at least some of the above-discussed drawbacks of the presently known systems. Another object of the invention is to provide a wireless train communication system which, to a relatively low cost, provides good data and voice communication to a plurality of users.

This object is achieved by means of a wireless communication system for a moving vehicle as defined in the appended claims.

According to the present invention, there is provided a wireless communication system for a moving vehicle, comprising:

at least one router in the moving vehicle for receiving and transmitting wireless voice communication and data communication to and from a stationary communication server outside said moving vehicle through an exterior mobile network; and at least one femtocell provided within the moving vehicle, and being connected to said router for wireless transferring of wireless voice communication and data communication between mobile terminals within the moving vehicle and said router, wherein said at least one femtocell is controlled by a femtocell controller directly or indirectly connected to the communication server outside the moving vehicle.

A femtocell is a small cellular base station covering a small area, such as an inner compartment of a vehicle. A femtocell may be regarded as a sub-group of picocells. Femtocells are per se known, and are typically used in homes or small businesses. It connects to the service provider's network via broadband (such as DSL or cable). Thus, a femtocell allows service providers to extend service coverage indoors, especially where access would otherwise be limited or unavailable. Although much attention is focused on WCDMA, the concept is applicable to all standards, including GSM, CDMA2000, TD-SCDMA, WiMAX, 4G and LTE solutions. Typically, the range of a femtocell is less than 50 meters, such as in the order of 30, 20 or 10 meters. Femtocells may be used for voice communication solely, or for both voice and data communication.

Communication cells arranged on moving vehicles may be referred to as "moving cells" or "moving infrastructure".

The femtocell in the vehicle is connected to a controller, functioning as a Base Station Controller (BSC). This controller may control several femtocells within the vehicle, and may also control femtocells in a plurality of different vehicles. The BSC performs radio resource management and hand-over functions, and aggregates data to be passed to a core network, and in particular to a Mobile Switching Centre (MSC) and/or a Serving GPRS Support Node (SGSN), which in turn may be connected to a Gateway GPRS Support Node (GGSN).

Even though femtocells are per se well known, such known femtocells are used in stationary environments, such as in private houses and in small offices. However, it has now been found by the present inventors that femtocells may also to great advantage be used on-board moving vehicles, such as trains. To this end, one or several femtocell(s) is/are arranged on-board the vehicle, and being controlled by a controller/BSC arranged outside the vehicle. Communication between the femtocell(s) and the controller/BSC is provided via an on-board router and a stationary communication server outside the moving vehicle, communicating through an exterior mobile network. The communication comprises both wireless voice communication and data communication in both directions.

The present invention enables a system which at the same time is very cost-efficient and provides very good communication capabilities, both for voice and data, and enables the system to be used simultaneously by a plurality of users.

By means of the present invention, voice and data traffic may be forwarded with high rate and throughput. The data traffic may also be related to voice data, e.g. when used for voice over IP (Internet telephony).

The present invention provides a centralized system, having a central system with one or several femtocells and a router. The router may be a mobile access router, and preferably a mobile access and applications router. The router is preferably at least partly responsible for supervision and control of the femtocells. Thus, an application running on the router may take care of part of the supervision and control of the femtocell(s), thereby taking care of part of the operations conventionally performed by the controller/BSC controlling a femtocell. These operations may consequently be performed only in the router, or both in the router and the controller/BSC. Hereby, communication between the train and the stationary units is made more efficient, and the overall efficiency of the femtocells is improved. In particular, it is preferred that the application on the router monitors the operation of the femtocell(s), and reports errors and malfunctions to the controller/BSC. Hereby, the controller/BSC may be provided with more detailed information about the femtocell than would otherwise be possible, such as the position of the train, operating conditions within the train, etc.

It is also possible to use the router to provide information to the users via the femtocells. For example, SMS messages or the like may be sent to the users within the train. This may be used to distribute general information related to the train or the communication system, specific information related to the train and the communication system and the like. For example, information about train delays, connections, estimation of arrival times, etc, may be communicated in this way. SMS messages communicated via the femtocells and the like may also be used to distribute access codes for Internet access through access points and the like. This also makes it possible to use the femtocells for billing also for other services, such as access to the Internet through access points. The user may request access, and in return get an access code, and be billed through his/hers own operator.

Hereby, several advantages are obtained. Due to the centralization of the system, installation and upgrading becomes much simpler and more cost-efficient. Instead of having to replace and/or upgrade units in each carriage, only a few units need to be replaced and/or upgraded. Further, most updates, such as adaptation to new networks, can in the present system be made solely in the router, or in the controller/BSC. The router can be updated relatively simply, e.g. by replacing or adding a new modem to the router. Consequently, there is a dramatic decrease in cost for installation and service Further, this solution enables users with terminals to get access to voice telephony and data traffic at all locations within the train. Further, better coverage and conditions, and better capacity for voice communication is achieved. The result is that more calls can be handled simultaneously, and with fewer inadvertently disconnected calls. The present invention efficiently solves the problem of handling handover for many people assembled together and travelling at high speed, such as onboard a train. Thus, an efficient full service communication solution is obtained, which may simultaneously be used for internet access, speech, and other services.

By the use of femtocells in accordance with the present invention, the train as a whole may be seen as a very limited number of terminals requiring handover as the train moves—i.e. each modem through which the router communicates with exterior networks, and serving the femtocells, may be seen as a "terminal", rather than each terminal used on-board the train. Thus, the number of "terminals" is typically reduced to less than 6, rather than the total number of terminals used in the train, which would typically be about 200.

Further, the previously known solutions require a large amount of power. Typically more than 400 W/carriage is necessary for the operation of the repeater units alone. This also leads to a significant heat generation, and a need to place the repeater units in separate cooled compartments. On the contrary, the presently proposed system can be operated with significantly lower power. This result in great savings in respect of the power consumption on the train, and also leads to significantly less heat generation, and separate cooling and the like is no longer necessary. Consequently, the units may be placed in any location on the train, and for example in an overhead compartment—a space which is rarely used. Consequently, the space utilization in the carriages becomes much more efficient.

In addition, the use of femtocells makes adequate billing of the users simple. Each user connecting to the femtocell could be billed directly by his/hers operator. This may e.g. be achieved by issuance of a codeword by the operator which is then returned by the user through the femtocell. Hereby, the billing is handled directly between the operator and the user, and the train operator, etc. need not be involved.

Preferably, the system comprises a plurality of femtocells connected to the router. This may be used for providing more than one femtocell in a single carriage or compartment of the vehicle. Additionally or alternatively, the moving vehicle may comprise a plurality of carriages, and wherein each carriage is provided with at least one of the plurality of femtocells. Hereby, the communication system can easily be expanded into multiple carriages, and a whole train set, to a low cost.

The wireless communication system may further comprise at least one wireless access point provided within the moving vehicle and being connected to the router for wireless transferring of data communication between mobile terminals within the moving vehicle and the router, wherein data communication through the wireless access point is independent from the femtocell controller. Thus, the users onboard the moving vehicle are here provided with two options: to use speech and data communication through the femtocell, and/or to use data communication through the wireless access point. Preferably, the access point(s) and femtocell(s) are arranged as integrated units.

The router and the communication server are preferably connected through a plurality of exterior mobile networks, which are simultaneously useable. Also, the router is preferably arranged to communicate with the communication server on at least two different communication routes having different characteristics, and to automatically separate the communication traffic between said communication routes based on specific optimization conditions, such as price and/or speed. Hereby, the communication can be automatically optimized based on specific conditions, such as price, speed, latency, etc. Such data communication routers are known from EP 1 175 757 by the same applicant, said document hereby incorporated by reference. Such routers are also commercially available from the applicant, Icomera AB. Hereby, the router may use all available data channels, such as two or more of e.g. GSM, Satellite, DVB-T, HSPA, EDGE, 1×RTT, EVDO, LTE, WiFi (802.11) and WiMAX; and combine them into one virtual network connection. An automatic selection is then made among the available channels to use the most cost effective combination that fulfils the users' availability, bandwidth and reliability requirements. Hence, a seamless distribution of the data among the different channels is obtained.

The router is preferably arranged to prioritize voice communication and data communication between the router and the communication server differently. Hereby, it is e.g. possible to prioritize voice communication over data communication so that lower latency is obtained for the voice communication.

The at least one femtocell may be arranged for wireless communication between mobile terminals within the moving vehicle and the router only in the GSM frequency bands of 1800 MHz, and preferably in the band 1878.1-1879.9 MHz. Hereby, an efficient communication is obtainable. In addition, this part of the GSM frequency bands is also free to use without any special permission or the like in many countries.

Each of the at least one femtocells preferably has a communication range in the range of 20-100 m, and preferably in the range 30-70 m, and most preferably in the range 40-60 m. This makes it possible to cover a typical train carriage etc by one femtocell only.

Preferably, the system comprises at least two antennas arranged externally on the train connected to the data communication router. This enables the use of MIMO (multiple-input and multiple-output) and/or antenna diversity for the external communication to and from the router. Hereby the router may comprise several antenna ports per modem, enabling MIMO for the external communication, and the high bandwidth thereby provided can then be distributed to the internal clients on the train with e.g. 802.11n.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

Figure 1:
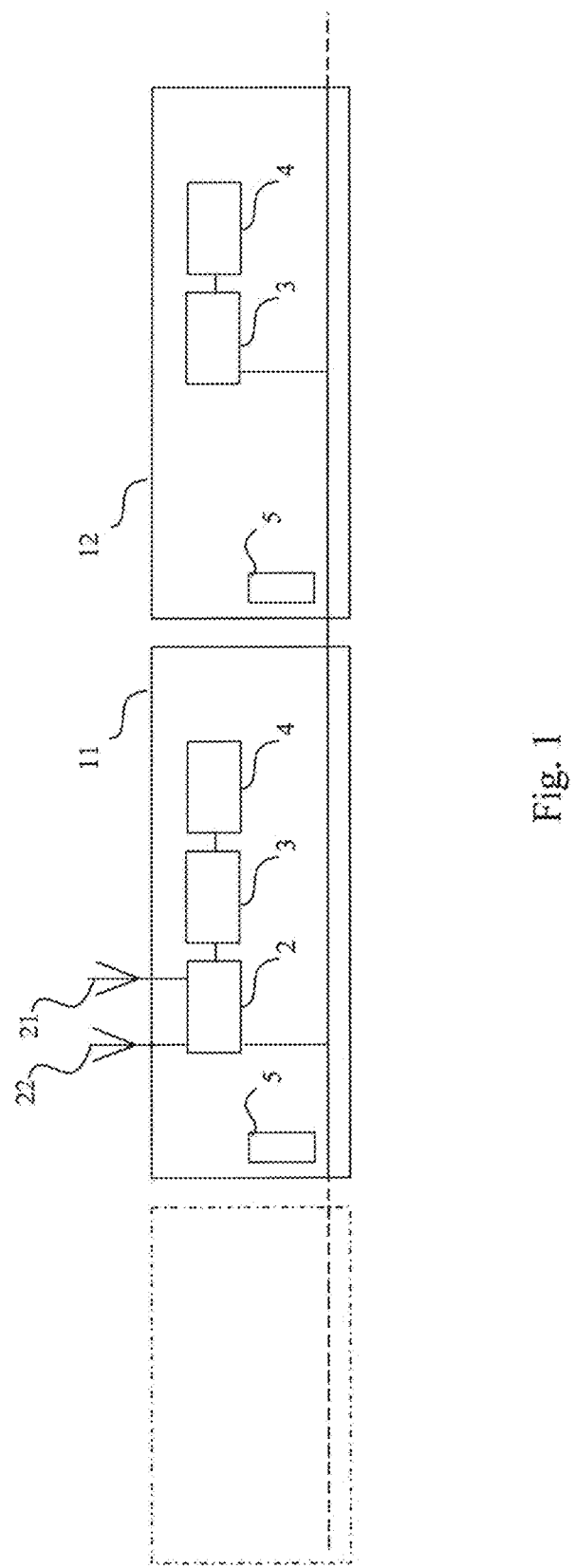
FIG. 1 is a schematic illustration of a train having a wireless communication system in accordance with an embodiment of the present invention.

In the following detailed description, preferred embodiments of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention. Even though in the following description, numerous specific details are set forth to provide a more thorough understanding of e present invention, it will be apparent to one skilled in the art that the present invention may be practiced without these specific details. In other instances, well known constructions or functions are not described in detail, so as not to obscure the present invention.

In FIG. 1 a schematic illustration of a train having a wireless communication system is provided. The train set comprises several carriages, of which two, 11, 12, are shown. The wireless train communication system comprises a router 2 for receiving and transmitting wireless voice communication and data communication, connected to one or several antennas 21, 22 on the train roof. Preferably, the router 2 is connected to at least two antennas, for enabling MIMO and/or antenna diversity.

The router 2 is arranged in one of the carriages, and in the illustrated example in carriage 11. The router 2 is relatively small, and may be arranged essentially anywhere in the interior of the carriage. In a preferred embodiment, these units are arranged in an overhead compartment—a space which is rarely used much for other purposes.

The router 2 is further connected to one or several femtocell(s)/picocell(s) 3. Preferably, at least one femtocell/picocell is arranged in each carriage.

Further, the router 2 may be connected to one or several wireless access point(s) 4. Preferably, at least one wireless access point is arranged in each carriage.

The router may also be denominated MAR (Mobile Access Router) or MAAR (Mobile Access and Applications Router).

Passenger terminals 5 may communicate with external suppliers via the femtocell(s)/picocell(s) and/or the wireless access point(s).

Figure 2:
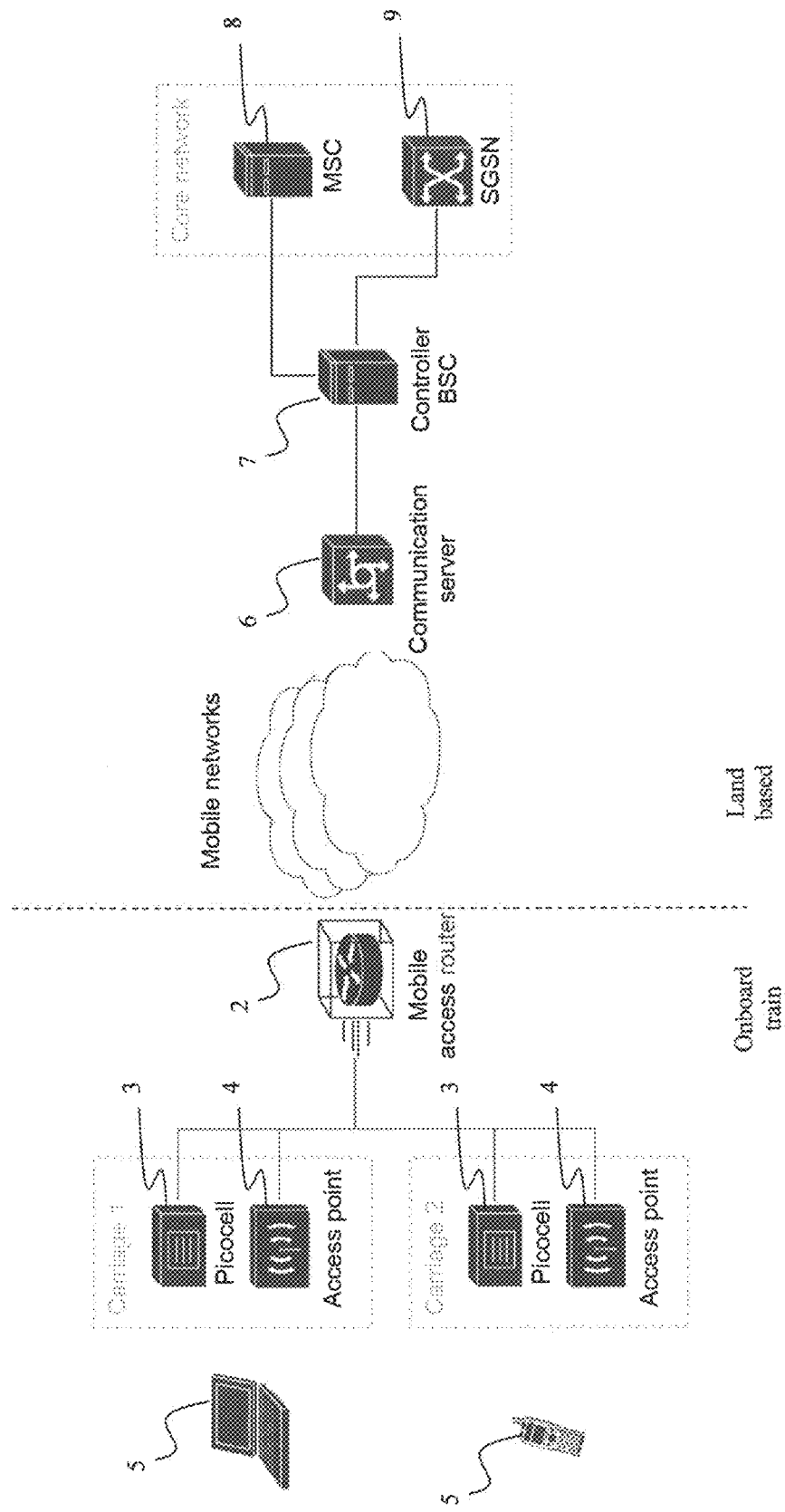
FIG. 2 is a more detailed block diagram of the wireless communication system of FIG. 1.

A more detailed embodiment of the communication system is illustrated in FIG. 2. As detailed in FIG. 2, there is provided a mobile access router 2 arranged onboard the train, and communicating with a stationary communication server 6 through an exterior mobile network.

The data communication router is preferably arranged to communicate on at least two different communication routes having different characteristics. Hereby, the communication can be automatically optimized based on specific conditions, such as price, speed, etc. Such data communication routers are known from EP 1 175 757 by the same applicant, said document hereby incorporated by reference. Such routers are also commercially available from the applicant, Icomera AB. Hereby, the router may use all available data channels, such as two or more of e.g. GSM, Satellite, DVB-T, HSPA, EDGE, 1×RTT, EVDO, LTE, WiFi (802.11) and WiMAX; and combine them into one virtual network connection. An automatic selection is then made among the available channels to use the most cost effective combination that fulfils the users' availability, bandwidth and reliability requirements. Hence, a seamless distribution of the data among said different channels is obtained.

Onboard the train, the router 2 is connected to one or several femtocell(s)/picocell(s), which is controlled by a femtocell controller/BSC 7 connected to the communication server 6 outside the train. Thus, the at least one femtocell/picocell provides wireless transferring of wireless voice communication and data communication between mobile terminals 5, such as mobile telephones, PDA:s, laptops, etc, within the train and the controller/BSC 7.

The femtocell is a small cellular base station covering a small area, such as a carriage of the train. The controller/BSC 7 may control several femtocells within the vehicle, and may also control femtocells in a plurality of different vehicles. The BSC performs radio resource management and hand-over functions, and aggregates data to be passed to a core network, and in particular to a Mobile Switching Centre (MSC) 8 and/or a Serving GPRS Support Node (SGSN) 9, which in turn may be connected to a Gateway GPRS Support Node (GGSN) (not shown).

Further, the router 2 may be connected to one or several wireless access point(s) 4, which enables data communication through the communication server 6. The wireless access point provides a wireless local area network (WLAN) for data communications with the mobile terminals within the train. Thus, communication through femtocells and the controller/BSC is enabled as one option, and communication through the communication server 6 and directly to suppliers on internet or the like, i.e. not through the controller/BSC, is enabled as a second option.

The femtocell(s)/picocell(s) and/or the wireless access point preferably provides transmission to and from the passenger terminals in a very broad frequency range, such as in the range of 80 MHz-2.5 GHz.

The present invention provides a centralized system, having a central router in one carriage, and a distributed access to said units in several carriages.

The communication system may be installed into existing train carriages to upgrade previously existing systems. In this case, part of the existing system, such as wiring etc. may possibly be reused in the new communication system. Alternatively, the system may be installed into new train carriages, allowing more systems and functions to be incorporated into the system without having to eliminate any pre-existing system components.

The invention has now been described with reference to specific embodiments. However, several variations of the communication system are feasible. For example, even though the above specific embodiments are related to train, it is apparent that similar systems may also be used onboard other moving vehicles, such as ships, airplanes, busses, etc. Further, the system may have multiple femtocells, or only one femtocell, and may also have additional wireless access points or not.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A wireless communication system for a train, comprising:
    at least one router in the train for receiving and transmitting wireless voice communication and data communication to and from a stationary communication server outside the train through an exterior mobile network;
    at least two antennas, arranged externally on the train and connected to the at least one router; and
    a plurality of femtocells, provided within the train and being connected to one of said at least one router, for wireless transferring of wireless voice communication and data communication between mobile terminals within the train and said at least one router, wherein said plurality of femtocells are controlled by a femtocell controller directly or indirectly connected to the stationary communication server outside the train, wherein the train comprises a plurality of carriages, and wherein each of the plurality of carriages is provided with at least one of said plurality of femtocells.

2. The wireless communication system of claim 1, further comprising at least one wireless access point provided within the train and being connected to said at least one router for wireless transferring of data communication between mobile terminals within the train and said at least one router, wherein data communication through said at least one wireless access point is independent from the femtocell controller.

3. The wireless communication system of claim 2, wherein the at least one wireless access point includes a plurality of access points and wherein respective pairs of the plurality of access points and the plurality of femtocells are arranged as respective integrated units.

4. The wireless communication system of claim 2, wherein the at least one router is a central router in one of the plurality of carriages and provides distributed access to plurality of femtocells and the at least one wireless access point in several carriages.

5. The wireless communication system of claim 1, wherein the at least one router and the communication server are connected through a plurality of exterior mobile networks, which are simultaneously useable.

6. The wireless communication system of claim 1, wherein the at least one router is arranged to communicate with the communication server on at least two different communication routes having different characteristics, and to automatically separate the communication traffic between said communication routes based on specific optimization conditions.

7. The wireless communication system of claim 6, wherein the specific optimization conditions include at least one of price, latency and speed.

8. The wireless communication system of claim 1, wherein the at least one router is arranged to prioritize voice communication and data communication between the at least one router and the communication server differently.

9. The wireless communication system of claim 8, wherein voice communication is prioritized over data communication so that lower latency is obtained for voice communication.

10. The wireless communication system of claim 1, wherein the plurality of femtocells is arranged for wireless communication between mobile terminals within the train and the at least one router only in the GSM frequency bands of 1800 MHz.

11. The wireless communication system of claim 10, wherein the plurality of femtocells is arranged for wireless communication between mobile terminals within the train and the at least one router only in the band 1878.1-1879.9 MHz.

12. The wireless communication system of claim 1, wherein each of the plurality of femtocells has a communication range in the range of 20-100 m.

13. The wireless communication system of claim 12, wherein each of the plurality of femtocells has a communication range in the range of 30-70 m.

14. The wireless communication system of claim 12, wherein each of the plurality of femtocells has a communication range in the range of 40-60 m.

15. The wireless communication system of claim 1, wherein the at least one router is arranged to supervise the functioning of the plurality of femtocells.

16. The wireless communication system of claim 15, wherein the router is arranged to report errors and malfunctions to the femtocell controller.

17. The wireless communication system of claim 1, wherein the femtocell controller is arranged outside the train.

18. A wireless communication system for a train, comprising:
- at least one router in the train for receiving and transmitting wireless voice communication and data communication to and from a stationary communication server outside the train through an exterior mobile network;
- at least two antennas, arranged externally on the train and connected to the at least one router; and
- a plurality of femtocells provided within the train and being connected to said at least one router, for wireless transferring of wireless voice communication and data communication between mobile terminals within the train and said at least one router, wherein said at least one femtocell is controlled by a femtocell controller directly or indirectly connected to the stationary communication server outside the train, wherein the at least one router is arranged to prioritize voice communication and data communication between the at least one router and the communication server differently, wherein voice communication is prioritized over data communication so that lower latency is obtained for voice communication.

* * * * *